(12) United States Patent
Weatherford

(10) Patent No.: US 7,468,831 B2
(45) Date of Patent: Dec. 23, 2008

(54) CONTRAST WITH FAST RESPONSE LIGHT SOURCE

(75) Inventor: William Thomas Weatherford, San Mateo, CA (US)

(73) Assignee: Miradia, Inc., Sunnyvale, CA (US)

( * ) Notice: Subject to any disclaimer, the term of this patent is extended or adjusted under 35 U.S.C. 154(b) by 0 days.

(21) Appl. No.: 11/676,967

(22) Filed: Feb. 20, 2007

(65) Prior Publication Data

US 2008/0198442 A1 Aug. 21, 2008

(51) Int. Cl.
*G02B 26/00* (2006.01)
(52) U.S. Cl. ....................... 359/291; 359/290
(58) Field of Classification Search ............... 359/291
See application file for complete search history.

(56) References Cited

U.S. PATENT DOCUMENTS

| | | | |
|---|---|---|---|
| 5,777,589 A | 7/1998 | Gale et al. | |
| 6,151,011 A | 11/2000 | Worley, III et al. | |
| 6,326,980 B1 | 12/2001 | Worley, III | |
| 2005/0162725 A1* | 7/2005 | Childers | 359/237 |
| 2006/0268002 A1* | 11/2006 | Hewlett et al. | 345/600 |
| 2007/0120786 A1* | 5/2007 | Bellls et al. | 345/84 |

* cited by examiner

*Primary Examiner*—Jordan M. Schwartz
*Assistant Examiner*—James C Jones
(74) *Attorney, Agent, or Firm*—Patterson & Sheridan, LLP

(57) ABSTRACT

Embodiments of the present invention generally relate to spatial light modulator devices, and more particularly to a display system and method of using one or more fast response light source, such as solid state light sources, and one or more spatial light modulator devices to improve the contrast ratio of the display system.

12 Claims, 7 Drawing Sheets

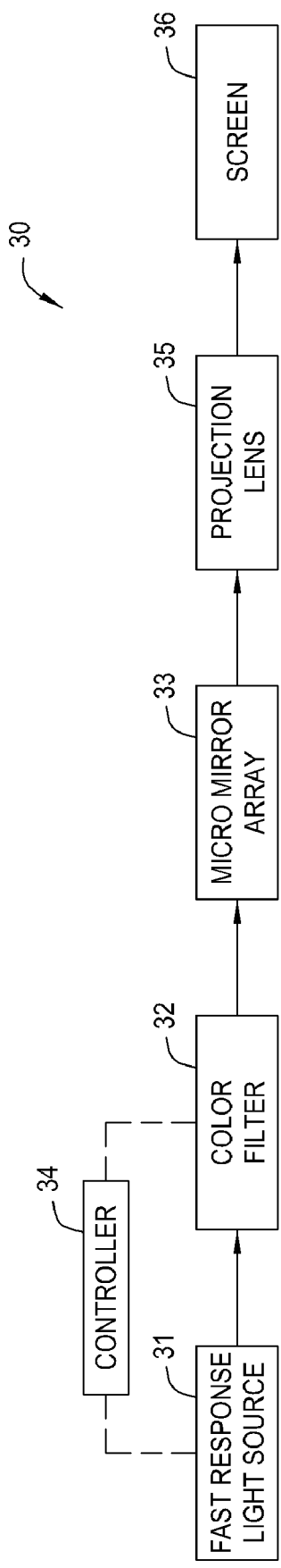
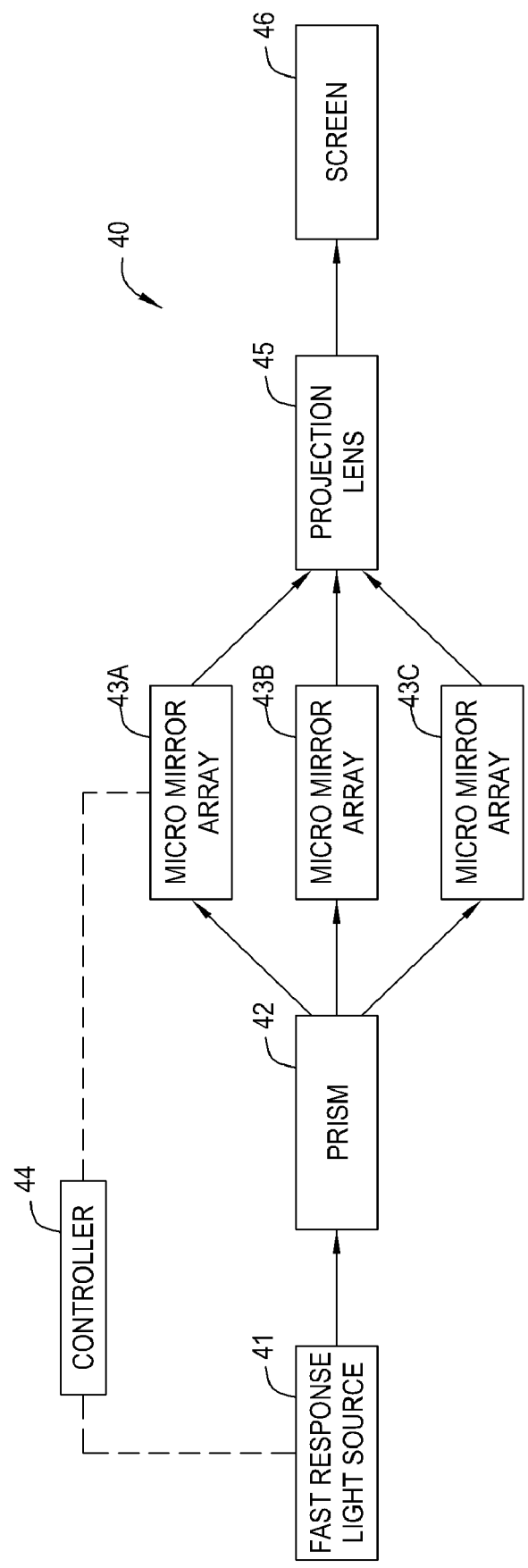

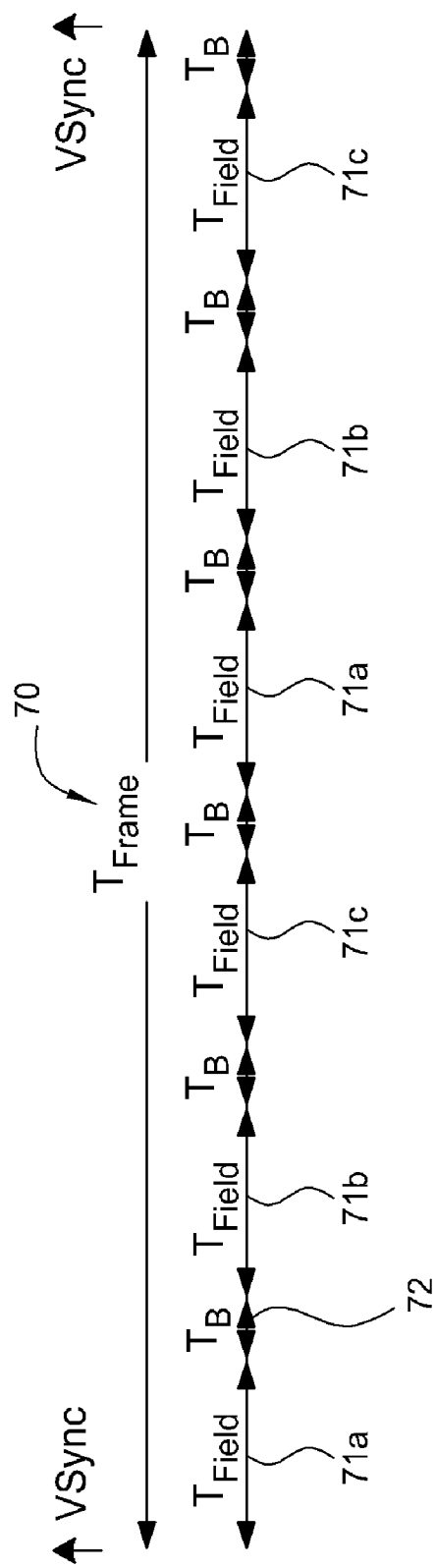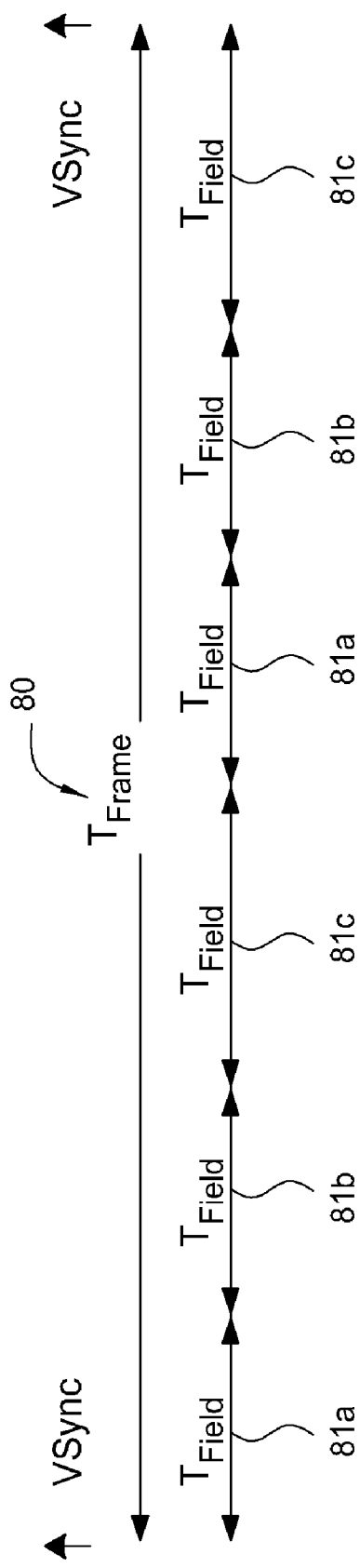

| IMAGER REGION | FIELD TIME SLICE | | | | | | | |
|---|---|---|---|---|---|---|---|---|
| | 1 | 2 | 3 | 4 | 5 | 6 | 7 | 8 |
| R0 - R3 | BINARY | L0 | L1 | L2 | L3 | L4 | L5 | L6 |
| R4 - R7 | L0 | BINARY | L1 | L2 | L3 | L4 | L5 | L6 |
| R8 - R11 | L0 | L1 | BINARY | L2 | L3 | L4 | L5 | L6 |
| R12 - R15 | L0 | L1 | L1 | BINARY | L3 | L4 | L5 | L6 |
| R16 - R19 | L0 | L1 | L2 | L3 | BINARY | L4 | L5 | L6 |
| R20 - R23 | L0 | L1 | L2 | L3 | L4 | BINARY | L5 | L6 |
| R24 - R27 | L0 | L1 | L2 | L3 | L4 | L5 | BINARY | L6 |
| R28 - R31 | L0 | L1 | L2 | L3 | L4 | L5 | L6 | BINARY |

CONTRAST WITH FAST RESPONSE LIGHT SOURCE

BACKGROUND OF THE INVENTION

1. Field of the Invention

Embodiments of the present invention generally relate to spatial light modulator devices, and more particularly to a display system and method of using one or more fast response light sources, such as solid state light sources, and one or more spatial light modulator devices to improve the contrast ratio of the display system.

2. Description of the Related Art

Spatial light modulator (SLM) devices have numerous applications in the areas of optical information processing, projection displays, video and graphics monitors, three-dimensional visual displays, holographic storage, microscopes, spectroscopes, medical imaging, and electrophotographic printing. A micro-mirror device (MMD) is one example of a SLM device. An MMD display typically comprises an array of mirrors in which each mirror can be electronically controlled to assume two positions—an "ON" state and an "OFF" state. Mirrors in an ON state reflect incident light to a projection lens onto a screen to form an image. Mirrors in an OFF state reflect incident light to a beam dump and do not reflect incident light to the projection lens. The brightness or intensity in an MMD display may be manipulated by controlling the time that a mirror spends in the ON state and in the OFF state during an image frame. Pulse width modulation (PWM) is one technique to control the time each mirror spends in the ON state during each frame time.

FIG. 1 is a bit-block representation of one example of a binary weighted PWM scheme in which the light intensity of a frame is controlled by splitting the frame into eight binary weighted time periods (B7-B0). The length of each block represents the amount of time the bit is asserted on an SLM, such as the amount of time a mirror of an MMD display is in the ON state. The length of time period corresponding to block B0, also called the least significant bit (LSB), is set at a predetermined value. The duration of the time period corresponding to B1 or the next significant bit is twice as long as that corresponding to the LSB. The duration of the time period corresponding to B2 is twice as long as that corresponding to the B1 and so on and so forth. Thus, the length of the time period corresponding to B7 (also called the most significant bit (MSB)) is 128 times the time period of the LSB. This gives a total of 256 possible intensity steps from zero intensity or full dark (where a mirror in an MMD display remains in the OFF state for the full frame time) to full intensity or full light (where a mirror in an MMD display remains in the ON state for the full frame time). U.S. Pat. No. 6,326,980 and U.S. Pat. No. 6,151,011 disclose other PWM schemes, the entirety of each being incorporated herein by reference.

One problem with MMD displays is producing good black levels due to the leakage of light. Therefore, a true "black" is difficult to provide; rather, black tones tend to appear gray. One issue that exacerbates this problem is that many MMD displays attempt to increase the total maximum brightness by providing a brighter light source. As a consequence, more light energy tends to leak from the display at zero normalized intensity, inhibiting even more the ability to produce a "true" black. Thus, these MMD displays provide poor contrast ratio and provide poor black levels.

One attempt to solve this problem has been the use of an iris aperture in the light path to attenuate the light to improve the contrast ratio. However, due to the slow speed of the mechanical iris aperture, the light can only be attenuated over an entire frame, including each of the primary color fields in the frame. One problem with this technique is that if any of the primary colors requires a high intensity of light, the light cannot be attenuated for the other color fields.

As the foregoing illustrates, there is a need in the art for an improved spatial light modulator devices and method of operating the same to improve the contrast ratio of the display system.

SUMMARY OF THE INVENTION

Embodiments of the present invention relate to a display system and method of using one or more fast response light sources, such as solid state light sources, and one or more spatial light modulator devices to improve the contrast ratio of the display system.

One embodiment of a method of operating a micro mirror array comprises providing a fast response light source adapted to direct light to a micro mirror array. A low intensity light from the fast response light source may be provided for a time segment if none of the mirrors of the micro mirror array will be in an ON state during the time segment.

Another embodiment of a method of operating a micro mirror array comprises providing a high intensity light from a fast response light source directed to a micro mirror array during a time segment of a color field of a frame and providing a low intensity light from the fast response light source during a different time segment of a different color field of the same frame.

One embodiment of a display system comprises one or more spatial light modulator devices. One or more fast response light sources are directed at the one or more spatial light modulator devices. A controller is coupled to the one or more fast response light sources to operate each fast response light source at a high intensity light mode and a low intensity light mode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a schematic diagram of an MMD display system including a fast response light source and a single micro mirror array, according to one embodiment of the invention.

FIG. 4 is a schematic diagram of an MMD display system including a fast response light source and three micro mirror arrays according to one embodiment of the invention.

FIG. 6 is a timing diagram conceptually illustrating how a frame may be split into color fields in an MMD display system with a color filter wheel, according to one embodiment of the invention.

FIG. 7 is a timing diagram conceptually illustrating how a frame may be split into color fields in an MMD display without a color filter wheel, according to one embodiment of the invention.

DETAILED DESCRIPTION

Figure 1:
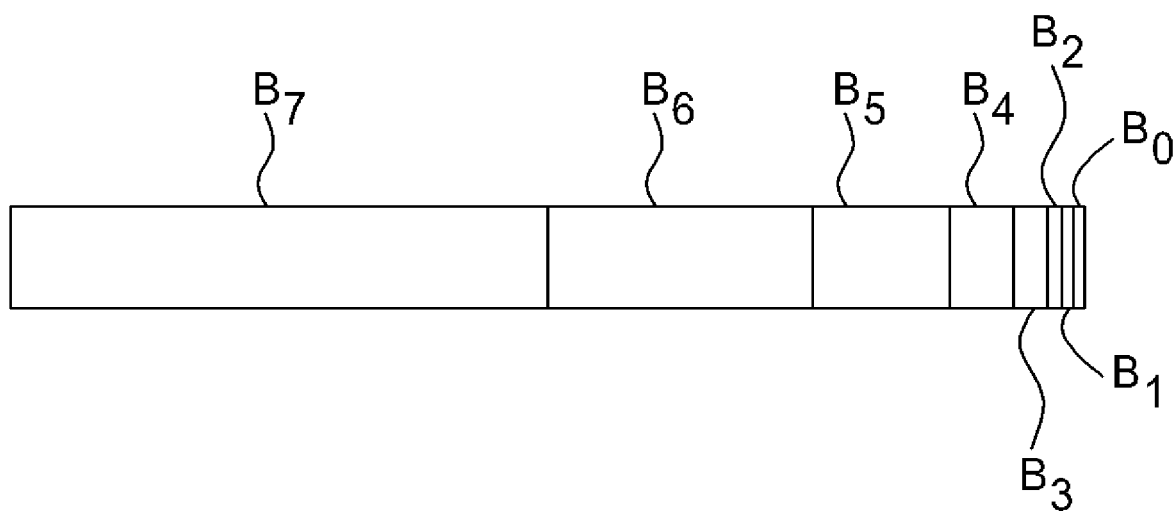
FIG. 1 is a bit-block representation of one example of a binary weighted PWM scheme.

Embodiments of the present invention relate to a display system and method of using one or more fast response light source, such as fast response light sources, and one or more spatial light modulator devices to improve the contrast ratio of the display system. For example, in certain embodiment one or more fast response light sources are use that can be quickly turned off or quickly turned to a reduced intensity during those modulation time units in which the mirrors have no ON states. Thus, contrast or black levels are improved.

As used herein, the term "fast response light sources" include lasers, light emitting diodes, ultra-high performance lamps, or any other light source that has a relatively fast response time to change the intensity of light, such as a response time of about 40 microseconds or less. The fast response light source in general should have a response time to change the intensity of the light that is small in comparison to the modulation time unit. The faster the response time, the more opportunities there are to turn the sold state light source off or to a reduced intensity. Any fast response light source that can change from high intensity to a low intensity may be used advantageously as part of the present invention.

As used herein, the term "low intensity light" includes light provided from a fast response source that is dimmed and includes when a fast response light source is turned off. In certain embodiments, it may be preferable that the light source is only dimmed. In certain embodiments, it may be preferable that the light source is turned off to provide the largest possible amount of contrast ratio improvement.

As used herein, the term "high intensity light" refers to a light provided from a fast response source that has a higher intensity that a low intensity light.

As used herein, the term "contrast ratio" refers to the ratio of the light output of the display screen for a color field at full ON versus the light output of the display screen for the color field at full OFF. Very small changes in the "full off" levels can drastically reduce the measured contrast ratio. For example, if the full ON is measured to be 750 units (lumens, nits, etc.) and the full OFF is 0.5 units, the contrast ratio is 1500:1. If the full OFF state can be reduced to 0.4 units, the contrast ratio will be increased to 1875:1. Contrast ratio as used herein does NOT refer to ANSI contrast which is measured by a pattern of alternating black and white rectangles in which the average light output from the white rectangles is divided by the average light output of the black rectangles.

FIG. 2 is a schematic diagram of an MMD display system 30 including a fast response light source 31 and a single micro mirror array 33, according to one embodiment of the invention. The fast response light source 31 is arranged such that the beam from the fast response light source is directed through a spinning color filter wheel 32 having one or more red, green, and blue sections. The color filter wheel 32 may also have a white or clear section to increase the amount of white light displayed. Red, green, blue light, and white light, as the case may be, is then shined onto the micro mirror array 33. One or more controllers 34 are coupled to the fast response light source 31, the color filter 32, and the micro mirror array 33 to synchronize the intensity of the light emitted from the fast response light source 31 with the rate of speed of the spinning color filter wheel 32 and with the state of the micro mirror array 33. The micro mirror array 33 is arranged to deflect pixels of light away from or through a projection lens 35 onto a display screen 36.

Figure 3:
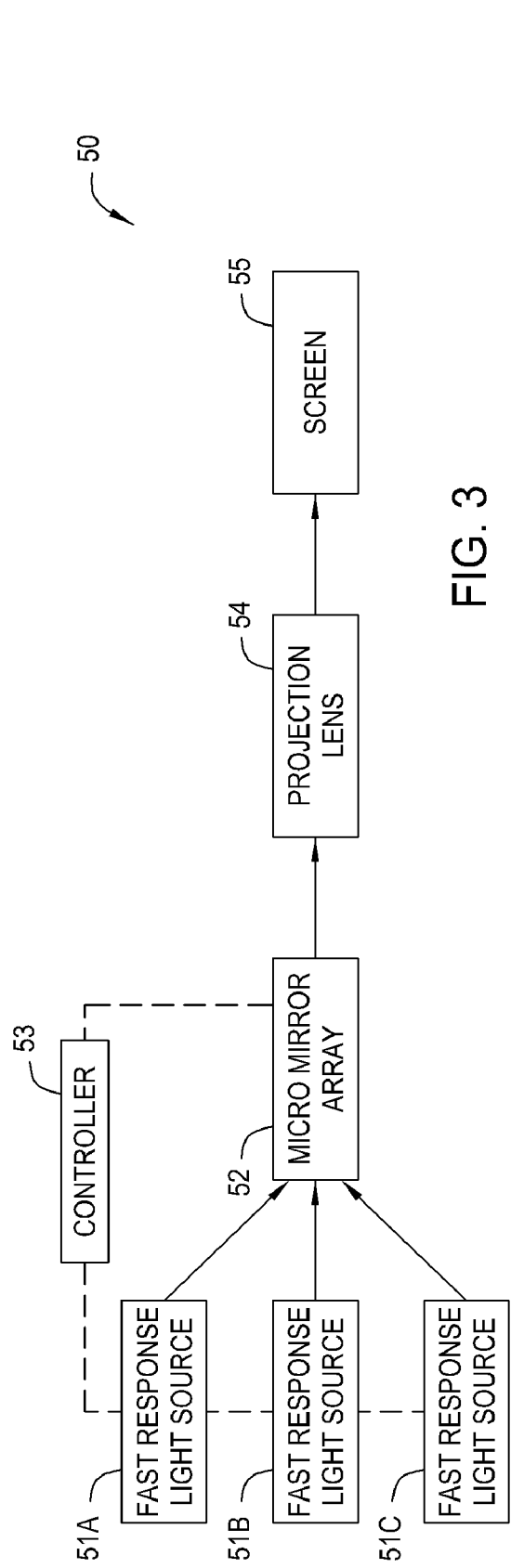
FIG. 3 is a schematic diagram of an MMD display system including three fast response light sources and one micro mirror array, according to one embodiment of the invention.

FIG. 3 is a schematic diagram of an MMD display system 50 including three fast response light source 51a, 51b, 51c and one micro mirror array 52, according to one embodiment of the invention. Fast response light source 51a, 51b, 51c, respectively, provides red light, green light, and blue light onto the micro mirror array 52. One or more controllers 53 are coupled to the fast response light sources 51 and the micro mirror array 52 to coordinate the intensity of the light from the fast response light sources 51 with the state of the micro mirror array 52. The micro mirror array 52 is arranged to deflect pixels of light away from or through a projection lens 54 onto a display screen 55.

FIG. 4 is a schematic diagram of an MMD display system 40 including a fast response light source 41 (with a full RGB color spectrum) and three micro mirror arrays 43a, 43b, 43c, according to one embodiment of the invention. The fast response light source 41 is arranged such that the beam from the fast response light source is directed through a prism 42. In other embodiments, one or more mirrors and/or other optical systems may be used instead of a prism or in conjunction with a prism. The prism 42 divides the light into red, green, and blue light, each of which is directed to a corresponding micro mirror array 43a, 43b, 43c, as shown. One or more controllers 44 are coupled to the fast response light source 41 and the micro mirror arrays 43 to coordinate the intensity of the light from the fast response light source 41 with the state of the micro mirror arrays 43. The micro mirror arrays 43 are arranged to deflect pixels of light away from or through a projection lens 45 onto a display screen 46.

Figure 5:
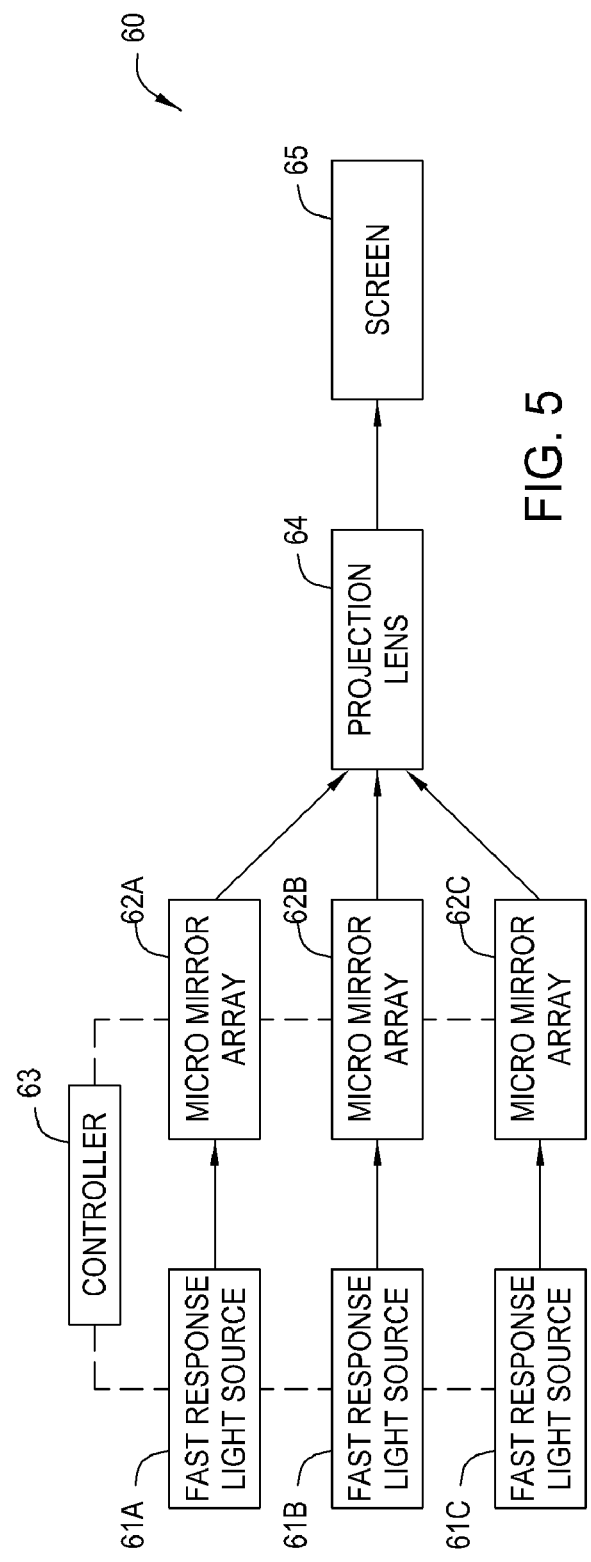
FIG. 5 is a schematic diagram of an MMD display system including three fast response light sources and three micro mirror arrays, according to one embodiment of the invention.

FIG. 5 is a schematic diagram of an MMD display system 60 including three fast response light sources 61a-c and three micro mirror arrays 62a-c, according to one embodiment of the invention. Fast response light sources 61a-c provides red, green, and blue light respectively, onto micro mirror array 62a-c. One or more controllers 63 are coupled to the fast response light sources 61a-c and the micro mirror arrays 62a-c to coordinate the intensity of the light from the fast response light sources 61a-c with the state of the micro mirror arrays 62a-c. The micro mirror arrays 62a-c is arranged to deflect pixels of light away from or through a projection lens 64 onto a display screen 65.

FIG. 6 is a timing diagram conceptually illustrating how a frame 70 may be split into color fields 71a-c in an MMD display system with a color filter wheel, such as the display system of FIG. 2, according to one embodiment of the invention. For a three segment color filter wheel rotating at two times the frame rate, the frame would be split into 6 color fields. In other words, two red color fields 71a, two green color fields 71b, and two blue color fields 71c. A blanking interval 72 may be disposed between each color field to prevent color abnormalities as each color wheel spoke traverses through the illumination beam. In other embodiments, a frame may be split into any number or order of color fields based up the number of segments of the color filter wheel and the rotational speed of the color filter wheel.

FIG. 7 is a timing diagram conceptually illustrating how a frame 80 may be split into color fields 81a-c in an MMD display without a color filter wheel, such as the display systems of FIG. 3. As shown, the frame can be split into 6 color fields—two red color fields 81a, two green color fields 82b, and two blue color fields 83c. Note that there is no blanking interval in this case since there is no color filter wheel employed. In other embodiments, the frame can be split into any number or order of color fields and the color fields may be interleaved.

Figure 8:
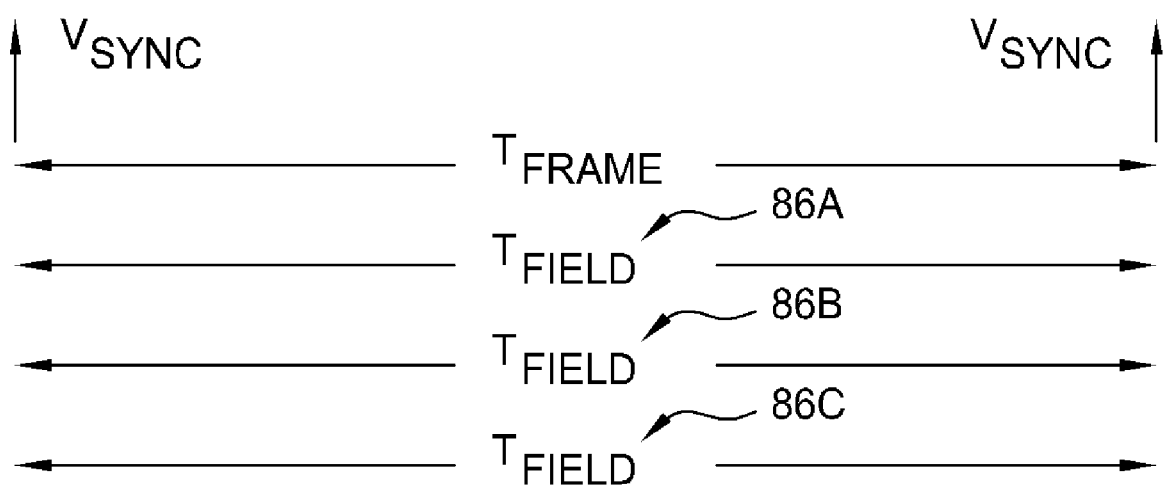
FIG. 8 is a timing diagram conceptually illustrating how a frame is controlled in an MMD display in which there are separate micro mirror arrays for each color, according to one embodiment of the invention.

FIG. 8 is a timing diagram conceptually illustrating how a frame is controlled in an MMD display in which there are separate micro mirror arrays for each color, such as the display systems of FIGS. 4 and 5. Since there are separate micro mirror arrays for each color, the frame does not need to be split into separate color fields. Each color field, such as red color field 86a, green color field 86b, and blue color field 86c can be the same duration of the frame.

For illustration purposes only, one approach to controlling a display system is to divide each micro mirror array, such as the micro mirror arrays of FIGS. 2-5, into 32 regions. For example, each region may include 12 lines of 512 pixels. Other configurations are possible, with each micro mirror array being controlled based on any number of sections, where each section may be further divided into any number of regions, where each region may include any number of lines, and where each line may include any number of pixels.

Figures 9, 10:
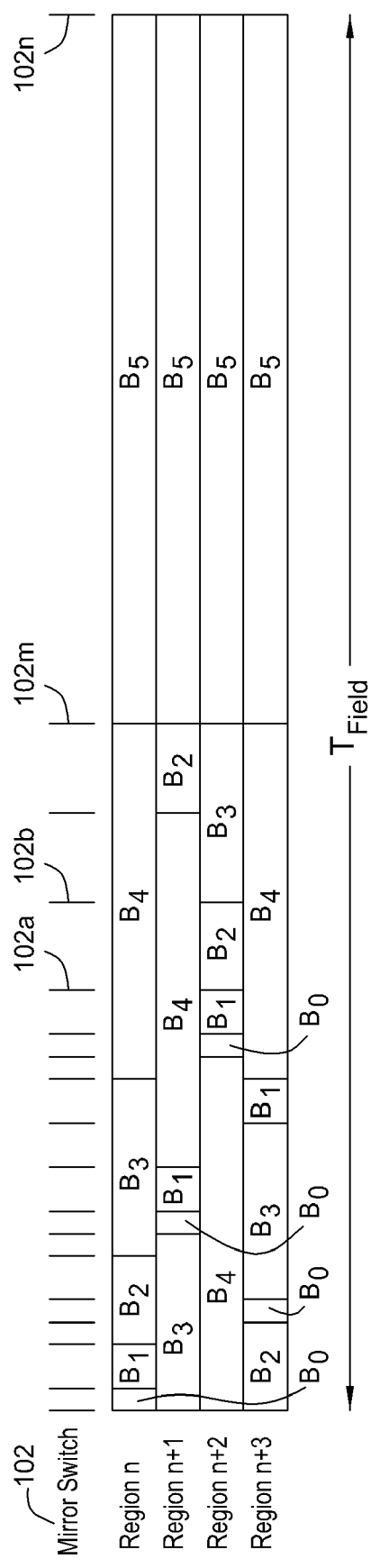
FIG. 9 illustrate a modulation sequence for controlling a color field and a fast response light source, according to one embodiment of the invention.
FIG. 10 is a bit-block representation of a binary-weighted segment of one of the groupings of imager regions, such as one of the binary weighted sequences of one of groups of imager regions of FIG. 9, according to one embodiment of the invention.

FIG. 9 illustrates a modulation sequence 90 for controlling a color field and a fast response light source within an MMD display, according to one embodiment of the invention. The color fields may be any of the time segments within a frame, such as one of the color fields in FIGS. 6-8. Other modulation sequences may also be used to advantage with this invention. As shown, a color field is split into eight time slices and the thirty-two regions are controlled in eight groups of four regions. In other embodiments, the color field may be split into any number of time slices, and the regions may be controlled in any number of groups. The time slices may include at least one binary-weighted time segment 93 and may include a plurality of linear bit segments 94, each having an equal duration of time. The binary weighted segment 93 may be arranged in any order between the different groups of regions. Here, the binary-weighted segment is offset from groups to groups of regions in order to reduce the controller bandwidth. The bits within the binary weighted segment may also be arranged in any order. Thus, the bit sequences may be the same or different from imager region or from groupings of imager regions.

FIG. 10 is a bit-block representation of a binary-weighted segment of one of the groupings of imager regions, such as one of the binary weighted sequences of one of groups of imager regions of FIG. 9, according to one embodiment of the invention. As shown, the most significant bit (B5) of the group of imager regions are aligned, whereas, the other bits are offset from each other in order to reduce the controller bandwidth. The mirror switch periods 102 are shown in which the state of the mirrors of one or more regions is updated.

In certain embodiments, the fast response light source, such as one of the fast response light sources of FIGS. 2-3, provides a low intensity light if the mirror state of the entire micro mirror array will be off during a time segment of a color field. With the fast response time of the fast response light source and knowledge of the state of the display for a given mirror switch, the light source can provide a low intensity light during those modulation times units that have no ON states.

For ease of illustration, the following example will be explained in reference to FIG. 9 and to FIG. 10. If there are no mirrors of the micro mirror array in an ON state for a time segment, then the fast response light source may provide a low intensity light for that time segment. That time segment may be one or more partial or full binary bits, one or more partial or full linear bits, and combinations thereof.

In one aspect, providing a low intensity light from the fast response light source for a time segment is performed at or after mirror switch times since one or more groups of mirrors may change states at this time. For example, during a color field time slice of FIG. 9 in which the binary weighted time segments are arranged in FIG. 10, if none of the mirrors in the entire micro mirror array for a color field will be in an ON state after a mirror switch, then the fast response light source may provide a low intensity light until the next mirror switch. For instance, if none of the mirrors will be in an ON state after mirror switch 102m (FIG. 10) in the binary weight bits or in the linear bits (FIG. 9) for the entire mirror array for the color field, the fast response light source may provide a low intensity light until mirror switch 102n. Thus, the fast response light source may provide a low intensity light for the entire micro mirror array for a color field during the Most Significant Bit (B5) of the binary modulated segment and during part of the linear segment for the other regions. In other examples, the fast response light source may provide a low intensity light between any mirror switch time if none of the mirrors of the micro mirror array for the color field are in an ON state between those mirror switch times, such as between mirror switch time 102a and 102b (FIG. 10) or such as between the mirror switch times for any single or combination of full or partial binary bits (FIG. 9) and full or partial linear bits 94 (FIG. 9).

Therefore, during a modulation time if the micro mirror array does not need light energy, the fast response light source can provide a low intensity light, thereby decreasing the amount of light that leaks from the display. Consequently, the display system may have improved contrast, full on/full off contrast may be increased, and/or black levels may be improved. In another aspect, if the micro mirror array during a time segment of a color field does not need light energy, the fast response light source may still provide a low intensity light even if the micro mirror array requires a high intensity light during a time segment of another color field within the frame since the fast response light source response time is fast enough to change intensities during these time segments. Since each primary color modulation is independent, as depicted in FIGS. 9 and 10, the light source can remain at a low intensity light for a greater amount of time than a prior art iris system. It is understood that the present invention of providing a low intensity light from the fast response light source during a time segment of a color field may be used to advantage with any modulation scheme.

With certain modulation schemes, there will be several modulation units where the entire array is updated before a mirror switch occurs. Tracking these states can be accomplished by a scan of the data from the controller to the imaging device. Another approach would involve actively tracking the internal state of the display array to determine whether any pixels will be in the ON state after the next mirror switch which would allow a low intensity light to be provided even longer. In general, the more time that a low intensity light is provided, the less light leakage there will be, and the more the contrast ratio will improve.

In certain embodiments, the fast response light source, such as the fast response light source of FIG. 4, provides a low intensity light if the mirror state of all mirrors of all the micro mirror arrays will be off during that time segment. For ease of illustration, these embodiments will be described in reference to FIG. 4. Since there is a single fast response light source 41, there is a single light directed to three micro mirror arrays 43a, 43b, and 43c. To improve contrast or black levels, a low intensity light may provided if none of the mirrors of all of the micro mirror arrays are in an ON state.

In certain embodiments, the fast response light source, such as one of the fast response light sources of FIG. 5, provides a low intensity light if all the mirrors of its respective micro mirror array will be off during that time segment. For ease of illustration, these embodiments will be described in reference to FIG. 5. Since there is an individual fast response light source 61 for an individual micro mirror array 62, each set of fast response light source and its corresponding micro mirror array can be operated independently of the other sets of fast response light source and its corresponding micro mirror array. For example, a low intensity light may be provided from fast response light source 61a if none of the mirrors of micro mirror array 62a are in an ON state regardless of whether or not any of the mirrors of micro mirror arrays 62b and 62c are in an ON state.

Figure 11:
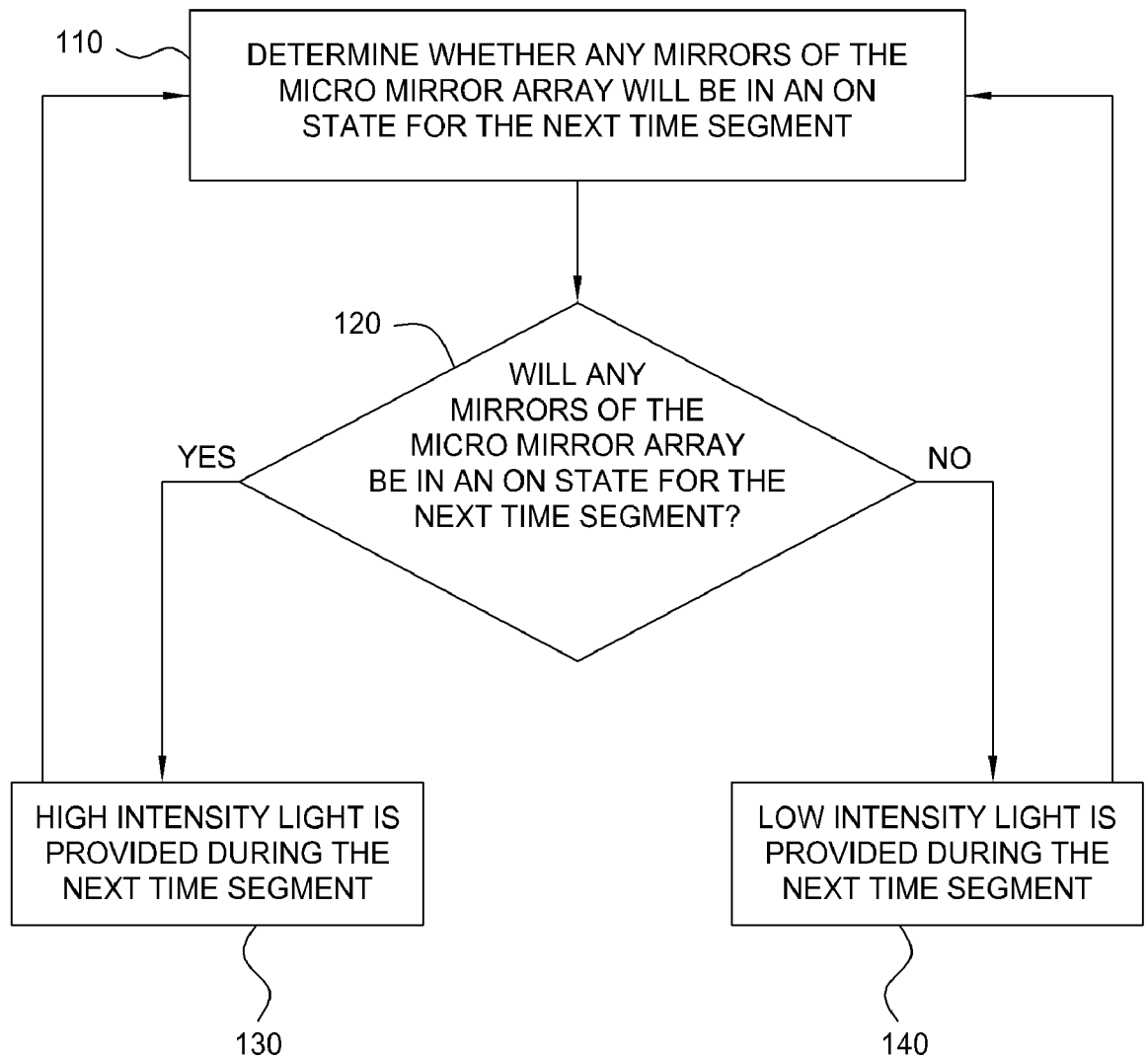
FIG. 11 is a flow chart of methods steps for controlling the fast response light source of a color field to provide improved contrast ratio, according to one embodiment of the invention.

FIG. 11 is a flow chart of method steps for controlling the fast response light source of a color field to provide for improved contrast ratio by actively tracking the state of the mirrors of the array, according to one embodiment of the invention. In step 110, a controller, such as the controllers of FIGS. 2-5, determines or monitors if any mirrors of the micro mirror array will be in an ON state for the next time segment. In step 120, the controller proceeds to step 130 or step 140 depending on whether any mirrors of the micro mirror array will be in an ON state for the next time segment. If any mirror of the micro mirror array will be in an ON state for the next time segment, then the fast response light source provides a high intensity light to the micro mirror array for that time segment in step 130. If none of the mirrors of the micro mirror array will be in an ON state for the next time segment, then the fast response light source provides a low intensity light to the micro mirror array for that time segment in step 140. Step 110 may be repeated for the subsequent next time segment. The controller does not require storing all the states of the mirrors to perform this method. As long as one of the mirrors of the micro mirror array is in an ON state during a time segment, then the fast response light source provides a high intensity light during this time segment. In certain aspects, the method of FIG. 11 may be performed to advantage with aligned modulation schemes, such as the aligned modulation schemes of FIG. 9 and FIG. 10, since the mirror switch times are aligned.

Other embodiments of providing a low intensity light from the fast response light source to improve contrast ratio may be devised. For example, the fast response light source may provide a low intensity light during the time it takes to switch the mirrors between and ON state and an OFF state. Therefore, the extra light provided during these times to switch states may be reduced.

While the foregoing is directed to embodiments of the present invention, other and further embodiments of the invention may be devised without departing from the basic scope thereof, and the scope thereof is determined by the claims that follow. For example, embodiments of the present invention have been described herein in conjunction one the aligned modulation sequences of FIG. 9 and FIG. 10. Embodiments of the present invention may also be used to advantage in other modulation sequences. For instance, embodiments of the present invention may be used in conjunction with the bit splitting method as described in U.S. Pat. No. 5,777,589, assigned to Texas Instruments. Regardless of modulation schemes, if the micro mirror array does not require light for a time segment, the fast response light source may provide a low intensity light, thereby reducing the amount of light that "leaks" and impairing contrast ratio. Embodiments of the present invention have been described herein in conjunction with a SLM comprising a micro mirror array. Embodiments of the present invention may also be used to advantage in any digitally modulated display, such as in LCD devices. Therefore, the scope of the present invention is defined by the claims that follow.

The invention claimed is:

1. A method of operating a micro mirror array, comprising:
   (a) controlling mirrors of a micro mirror array to transition from an OFF state to an ON state;
   (b) during step (a) and after at least one mirror of the micro mirror array has transitioned to an ON state, controlling a fast response light source to direct high intensity light to all mirrors of the micro mirror array;
   (c) controlling the mirrors of the micro mirror array to transition from the ON state to the OFF state;
   (d) controlling the fast response light source to continue directing high intensity light to all mirrors of the micro mirror array while the mirrors of the micro mirror array are transitioning from the ON state to the OFF state; and
   (e) after all mirrors of the micro mirror array have transitioned from the ON state to the OFF state, controlling the fast response light source to produce low intensity light.

2. A display system, comprising:
   one or more spatial light modulator devices including one or more micro mirror arrays;
   one or more fast response light sources directed at the one or more spatial light modulator devices; and
   a controller coupled to the one or more fast response light sources to operate each fast response light source at a high intensity light mode or at a low intensity light mode,
   wherein for each micro mirror array, the controller is configured to:
   (a) control mirrors of the micro mirror array to transition from an OFF state to an ON state;
   (b) during (a) and after at least one mirror of the micro mirror array has transitioned to an ON state, control the fast response light source to direct high intensity light to all mirrors of a micro mirror array;
   (c) control the mirrors of the micro mirror array to transition from the ON state to the OFF state;
   (d) control the fast response light source to continue directing high intensity light to all mirrors of the micro mirror array while the mirrors of the micro mirror array are transitioning from the ON state to the OFF state; and
   (e) after all mirrors of the micro mirror array have transitioned from the ON state to the OFF state, control the fast response light source to produce low intensity light.

3. The method of claim 1, wherein the low intensity light is produced by dimming the fast response light source.

4. The method of claim 1, wherein the low intensity light is produced by turning off the fast response light source.

5. The method of claim 1, wherein steps (a) through (e) are carried out for a first color field of a frame and then repeated for a second color field of the frame that is different from the first color field.

6. The method of claim 5, wherein steps (a) through (e) are further repeated for a third color field of the frame that is different from both the first color field and the second color field.

7. The system of claim 2, wherein the low intensity light is produced by dimming the fast response light source.

8. The system of claim 2, wherein the low intensity light is produced by turning off the fast response light source.

9. The system of claim 2, wherein the spatial light modulator devices includes multiple micro mirror arrays, each corresponding to a color.

10. The system of claim 9, wherein a micro mirror array is provided for each of red, green and blue colors.

11. The system of claim 2, further comprising a color filter, wherein the controller is configured to control mirrors of the micro mirror array for a series of time segments, each time segment corresponding to a color field of a frame.

12. The system of claim 2, further comprising a color filter, wherein a color field corresponding to each time segment is different from a color field corresponding to a previous time segment.

* * * * *